United States Patent
Müller

(10) Patent No.: US 6,345,237 B1
(45) Date of Patent: Feb. 5, 2002

(54) VEHICLE INSPECTION DEVICE

(76) Inventor: Roland Müller, Blieskasteler Weg 15a, 66453 Gersheim (DE)

( * ) Notice: Subject to any disclaimer, the term of this patent is extended or adjusted under 35 U.S.C. 154(b) by 0 days.

(21) Appl. No.: 09/254,054

(22) PCT Filed: Aug. 29, 1997

(86) PCT No.: PCT/DE97/01900

§ 371 Date: Feb. 26, 1999

§ 102(e) Date: Feb. 26, 1999

(87) PCT Pub. No.: WO98/10263

PCT Pub. Date: Mar. 12, 1998

(30) Foreign Application Priority Data

Sep. 2, 1996 (DE) .......................... 196 35 194

(51) Int. Cl.$^7$ .......................... G01L 25/00; G01M 7/00; G01M 9/00
(52) U.S. Cl. ...................................... 702/113; 73/11.04
(58) Field of Search .......................... 702/113; 73/11.04, 73/11.05, 11.07, 11.08, 11.09, 669, 670

(56) References Cited

U.S. PATENT DOCUMENTS

| | | | |
|---|---|---|---|
| 2,709,361 A | 5/1955 | Marcus | |
| 3,848,456 A | * 11/1974 | Van der Perk | 73/11 |
| 5,259,246 A | * 11/1993 | Stuyts | 73/669 |
| 5,756,877 A | * 5/1998 | Nozaki | 73/11.09 |

FOREIGN PATENT DOCUMENTS

| | | |
|---|---|---|
| DE | 27 35 925 A | 3/1978 |
| EP | 0 124 258 A | 11/1984 |
| EP | B-0 373 653 | 6/1990 |
| EP | 0 747 688 | 12/1996 |
| FR | 1 096 315 A | 6/1995 |

* cited by examiner

Primary Examiner—Marc S. Hoff
Assistant Examiner—Demetrius Pretlow
(74) Attorney, Agent, or Firm—Henry M. Feiereisen; Ursala B. Day

(57) ABSTRACT

The invention relates to a vehicle testing device for carrying out various tests on a vehicle, with the tires of the vehicle being respectively placed on two driveable rotatable rollers. Known vehicle testing devices have a need for substantial space and incur high production costs. Object of the invention is to enable a less expensive and more compact inspection of the vehicle. According to the invention, this is attained by placing a shock absorber testing device in the area of both rollers. The additional axial displacement of the rollers and provision of a third roller disposed in parallel relationship thereto and also shiftable in axial direction enables a testing of brakes, tracking, steering play, joint play as well as shock absorbers in a smallest space.

7 Claims, 2 Drawing Sheets

VEHICLE INSPECTION DEVICE

BACKGROUND OF THE INVENTION

The invention relates to a vehicle testing device for carrying out various tests on a vehicle.

Such vehicle testing devices are known. For example in the field of testing brakes, devices are used which are also designated as "roller test stand" and check the brake performance of a motor vehicle located on the test stand by decelerating the driven rollers through the vehicle brakes.

Numerous vehicle testing devices are known for use in garages which typically include test devices for brakes, tracking, axle play and steering play as well as also for shock absorbers. Normally, the individual test components are arranged in succession along an inspection line. The spatial requirements for such an inspection line is great so that smaller repair shops frequently are not in a position to offer a complete testing of the relevant parameters. Moreover, an underfloor installation of such an inspection line is very costly as respective wells must be provided in the floor of the garage for accommodating all successively arranged testing devices. Finally, also the high manufacturing costs for the inspection line comprised of a relative great number of individual components have to be taken into account, resulting in high purchase prices.

European Pat. No. EP-B-0 373 653 describes a vehicle testing device, with the tires of the vehicle being placed on movable supports, and with the supports for the vehicular wheels on each vehicle side arranged on a pair of movable platforms which are disposed in parallel relationship on opposite sides of a measuring reference line. The pairs of supports on the front wheel side and on the rear wheel side and the pairs of movable platforms are movable symmetrically in the direction of the vehicular width to or away from respective supports points of the supports and the platforms, respectively, whereby the support points are arranged approximately on the measuring reference line. As a consequence of its complexity, this device could not succeed in the market for garage equipments.

European Pat. No. EP-A-0 124 258 discloses a vehicle testing device according to the preamble, having rollers which are movable in axial direction. In this vehicle testing device, a third roller is arranged in the area of wheel contact in parallel relationship to the axially movable driven rollers and is provided with means for determining and indicating the axial displacement of the third roller. This device allows determination of the track of the vehicle.

German Pat. No. DE-A-27 35 925 discloses a test device for motor vehicles which includes two rollers arranged at a predetermined distance in parallel relationship to one another, with a third roller as test roller being arranged between both rollers in frictional contact with the wheel. This device allows various measurements of a motor vehicle; however, there are no provisions for shock absorber measurement.

U.S. Pat. No. 2,709,361 discloses a device for transmitting vibrations to a vehicle, with a third "roller" of rectangular cross-section being arranged between two rollers for simulating bumpy roads.

The European Pat. No. 0 747 688 based thereupon and published subsequently describes a vehicle testing device which includes a support element between two rollers and is shiftable in vertical direction for permitting a testing of the suspension and the damping of a vehicle. However, this device does not allow a track measurement.

SUMMARY OF THE INVENTION

It is thus an object of the invention to provide a vehicle testing device which allows execution of as many tests as possible on a vehicle while yet requiring as little space and costs as possible.

This object is attained according to the invention by a vehicle testing device for executing several tests on a vehicle, with the tires of the vehicle being respectively placed on two driveable rotatable rollers, wherein an axially shiftable third roller is arranged between the two rollers in a wheel contact plate which is displaceable in vertical direction and disposed above a shock absorber testing device, with the full contact force of the wheel bearing on the wheel contact plate during the shock absorber test, and with means for measuring the axial displacement of the third roller being provided.

Through this measure, a track measurement and shock absorber test can be executed in the area of the rollers in addition to the common brake test. This saves installation costs and space as the demand for additional space to install the shock absorber testing device is very moderate.

It is within the scope of the invention that the driveable rotatable rollers are displaceable in axial direction.

In this manner, it is possible, again without any need for further space, to check in addition axle play and steering-wheel play.

Suitably, the axial shifting capabilities of the driveable rotatable rollers is lockable.

It is also advantageous, that the driveable rotatable rollers are displaceable in axial direction in parallel disposition to one another.

It may also be provided that the driveable rotatable rollers are axially displaceable in opposite direction.

It is within the scope of the invention to allow an underfloor installation of the vehicle testing device.

Furthermore, it is suitable that the vehicle testing device can be installed on a lifting platform.

BRIEF DESCRIPTION OF THE DRAWINGS

An exemplified embodiment of the invention will now be described with reference to the drawings, in which.

DETAILED DESCRIPTION OF PREFERRED EMBODIMENTS

Figure 1:
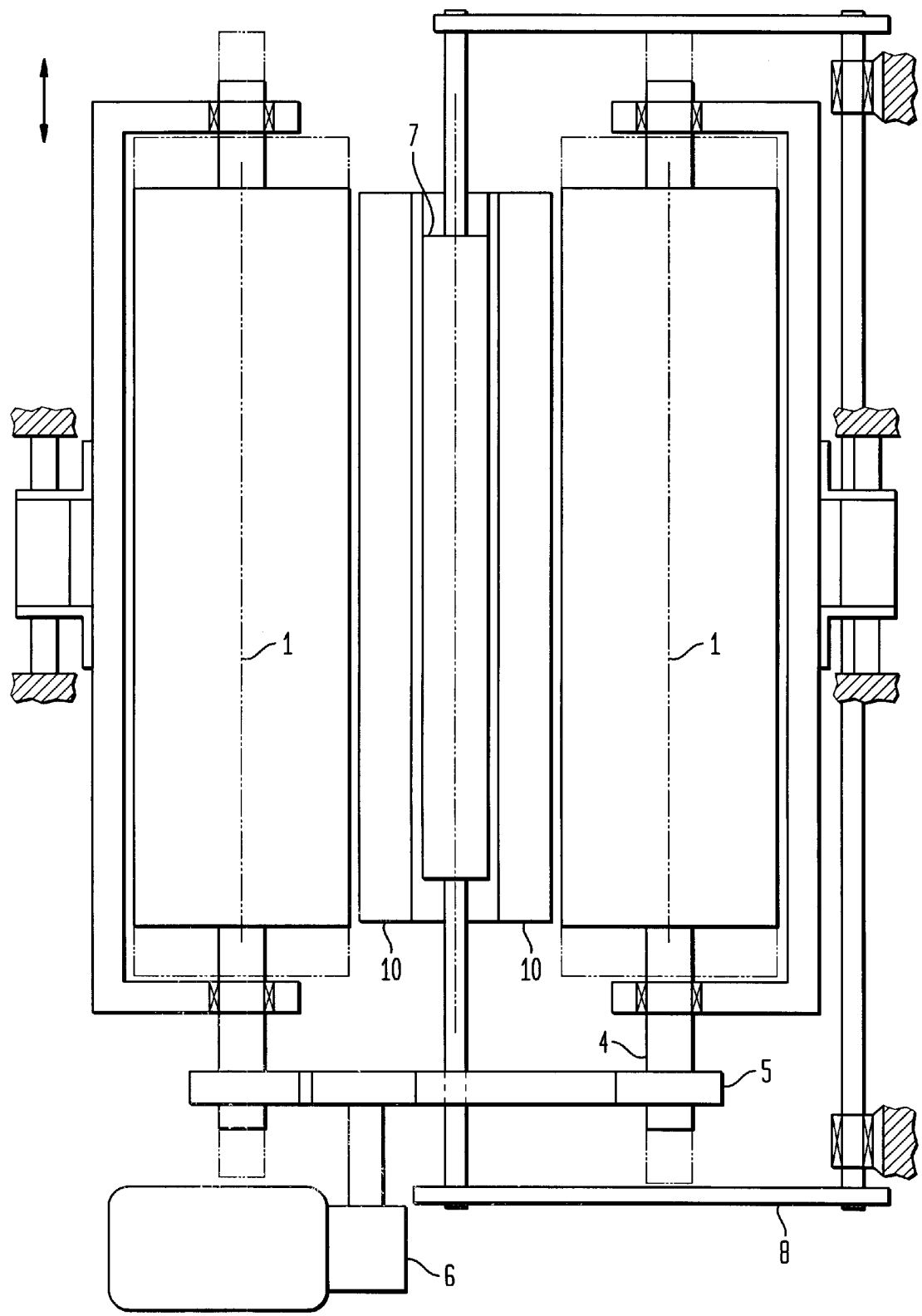
FIG. 1 is a top view of a vehicle testing device according to the invention.
Figure 2:
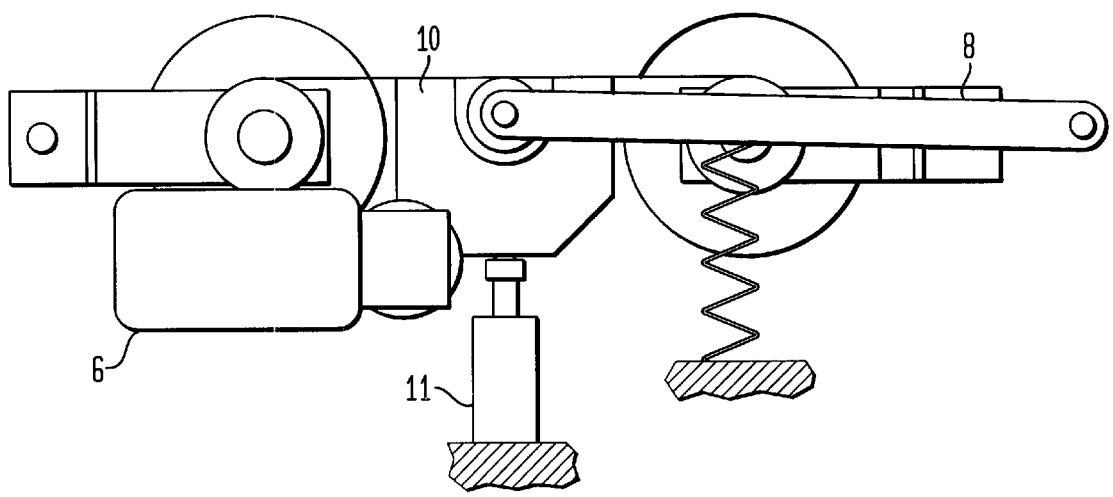
FIG. 2 is a side view of a vehicle testing device according to the invention.

As shown in FIGS. 1 and 2, the vehicle testing device according to the invention includes two rotatable rollers 1 which are driven by a drive 6 and in contact with a wheel of the vehicle to be tested during inspection. The drive of the rollers is realized in the shown example from the drive 6 via belts to respective wheels 5 on the shafts 4 of the rollers 1. With such a device, the brakes of a vehicle can be checked by determining the brake force applied onto the rollers 1 when braking the vehicle.

Arranged between both rollers and parallel thereto is a third roller 7 which is arranged for axial displacement in a circularly moving frame 8. The third roller 7 is supported by a wheel contact plate 10. This wheel contact plate 10 is movable in vertical direction. The third roller 7 represents the development of a track measuring plate of a typical length of 1 m and is in contact with the vehicular tire which is arranged on both rollers 1. After a number of revolutions of the third roller 7, which corresponds, for example, to a travel distance of 1 m, the axial deviation of the third roller 7 from the normal position is measured, and this value forms the basis for determining the track of the vehicle.

The steering-wheel play of the vehicle can be tested through axial displacement of the rollers 1 in opposite direction, while an axial displacement of the rollers 1 in same direction permits an inspection of the axle play.

In the area of both rollers 1, the device according to the invention includes a shock absorber testing device 11. This may be realized, as illustrated, by arranging a shock absorber testing device 11 underneath the vertically displaceable wheel contact plate 10. The shock absorber inspection is realized by lifting the wheel contact plate 10 so that the full contact force of the wheel, on which the shock absorber test is conducted, is applied upon the wheel contact plate 10. As the mass thereof is known, the remaining mass ratios determinative for the shock absorber test can be ascertained from the oscillation behavior of the oscillating system wheel-shock absorber-suspension-body.

The installation of the shock absorber testing device 11 underneath the roller test stand is space-saving as it eliminates the need for the current, generally mobile shock absorber tester in the garage. Moreover, the wheel contact plate 10 which is anyway used for the track measurement can additionally be exploited, thereby realizing cost savings. Finally, the shock absorber testing device 11 is protected in an optimal manner in an underfloor mounted vehicle testing device.

The ability of the wheel contact plate 10 to travel in vertical direction is also advantageous insofar as the vehicle can pull out from the depression between the rollers 1 much easier than normally realized, through slight lifting of the wheel contact plate 10.

The vehicle testing device according to the invention can be mounted underfloor, as described, whereby the compact structure results in a significantly smaller excavation than previously required. However, it is also possible and even suitable to arrange the vehicle testing device on a lifting platform as costs for an underfloor assembly are eliminated and the bottom area of the vehicle can be observed or also worked on in an ideal manner.

What is claimed is:

1. A vehicle testing device for carrying out multiple tests on a vehicle, comprising two driveable rotatable rollers for receiving the tires of a vehicle to be tested;

a wheel contact plate, disposed between the said rotatable rollers and above a shock absorber testing device; said contact plate is displacable in a vertical direction;

a third roller supported by the wheel contact plate and axially shiftable in said wheel contact plate and means for measuring an axial displacement of the third roller; and wherein during application of a shock absorber test, a full contact force of a vehicle wheel bears upon the contact plate.

2. The vehicle testing device of claim 1, wherein the driveable rotatable rollers are shiftable in axial direction.

3. The vehicle testing device of claim 2, further comprising a locking mechanism for locking the axial shifting of the driveable rotatable rollers.

4. The vehicle testing device of claim 2, wherein the driveable rotatable rollers are shiftable in axial direction in parallel relationship to one another.

5. The vehicle testing device according to claim 2, wherein the driveable rotatable rollers are shiftable in axial direction in opposite direction.

6. The vehicle testing device of claim 1, wherein the vehicle testing device is adapted for underfloor installation.

7. The vehicle testing device of claim 1, wherein the vehicle testing device is adapted for installation on a lifting platform.

* * * * *